United States Patent
Shinoda et al.

(10) Patent No.: US 7,415,081 B2
(45) Date of Patent: Aug. 19, 2008

(54) ORTHOGONAL FREQUENCY DIVISION MULTIPLE SIGNAL RECEPTION APPARATUS, RECEPTION APPARATUS, ORTHOGONAL FREQUENCY DIVISION MULTIPLE SIGNAL RECEPTION METHOD, AND RECEPTION METHOD

(75) Inventors: Atsushi Shinoda, Sagamihara (JP); Yasuhide Okuhata, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 567 days.

(21) Appl. No.: 10/477,697

(22) PCT Filed: Jun. 13, 2002

(86) PCT No.: PCT/JP02/05892

§ 371 (c)(1),
(2), (4) Date: May 12, 2004

(87) PCT Pub. No.: WO03/001713

PCT Pub. Date: Jan. 3, 2003

(65) Prior Publication Data

US 2004/0179633 A1     Sep. 16, 2004

(30) Foreign Application Priority Data

Jun. 22, 2001 (JP) .......................... 2001-189387

(51) Int. Cl.
H04L 27/06 (2006.01)

(52) U.S. Cl. ..................... 375/343; 375/348; 375/327; 375/371

(58) Field of Classification Search ................. 375/340, 375/343, 348, 346, 350, 376, 373, 371, 362; 370/203

See application file for complete search history.

(56) References Cited

U.S. PATENT DOCUMENTS 3,447,084 A * 5/1969 Haner et al. .................. 455/46

(Continued)

FOREIGN PATENT DOCUMENTS

EP 0 998 085 5/2000

(Continued)

OTHER PUBLICATIONS

International Search Report, Sep. 3, 2002.

(Continued)

*Primary Examiner*—Chieh M. Fan
*Assistant Examiner*—Aristocratis Fotakis
(74) *Attorney, Agent, or Firm*—Eric J. Robinson; Robinson Intellectual Property Law Office, P.C.

(57) ABSTRACT

Reception timing of a signal consisting of a valid symbol section and a guard interval section is controlled properly. According to a result of auto-correlation calculation performed by a guard correlation processor, a timing adjustment block generates a control voltage for adjusting the reception timing of the valid symbol section. A first and a second loop filter filter the control voltage signal generated by the timing adjustment block and sends it to a switch. An inter-symbol interference decision block decides whether an inter-symbol interference is generated according to the result of the auto-correlation calculation performed by the guard correlation processor, and controls the switch according to the decision result. Where, in the first loop filter, a comparatively large gain is set while in the second loop filter, a comparatively small gain is set.

7 Claims, 7 Drawing Sheets

U.S. PATENT DOCUMENTS

| | | | | |
|---|---|---|---|---|
| 3,909,735 | A * | 9/1975 | Anderson et al. | 331/10 |
| 5,448,596 | A * | 9/1995 | Ezran et al. | 375/350 |
| 5,541,965 | A | 7/1996 | Daffara | |
| 5,640,126 | A * | 6/1997 | Mellot | 329/325 |
| 5,677,927 | A * | 10/1997 | Fullerton et al. | 375/130 |
| 5,848,107 | A * | 12/1998 | Philips | 375/342 |
| 6,111,919 | A * | 8/2000 | Yonge, III | 375/260 |
| 6,115,354 | A * | 9/2000 | Weck | 370/203 |
| 6,219,334 | B1 * | 4/2001 | Sato et al. | 370/210 |
| 6,462,623 | B1 * | 10/2002 | Horan et al. | 331/17 |
| 6,538,518 | B1 * | 3/2003 | Chengson | 331/17 |
| 6,650,617 | B1 * | 11/2003 | Belotserkovsky et al. | 370/210 |
| 6,870,893 | B2 * | 3/2005 | Tore | 375/350 |
| 6,947,512 | B1 * | 9/2005 | Shinoda et al. | 375/371 |
| 7,173,983 | B1 * | 2/2007 | Meyer | 375/340 |
| 2002/0141486 | A1 * | 10/2002 | Bottomley et al. | 375/148 |

FOREIGN PATENT DOCUMENTS

| | | |
|---|---|---|
| EP | 1 089 510 | 4/2001 |
| JP | 10-322303 | 12/1998 |
| JP | 2001-103033 | 4/2001 |
| JP | 2001-111521 | 4/2001 |
| JP | 2001-177498 | 6/2001 |
| JP | 2001-177500 | 6/2001 |
| JP | 2001-203666 | 7/2001 |
| JP | 2001-313626 | 11/2001 |
| JP | 2001-333042 | 11/2001 |

OTHER PUBLICATIONS

Supplementary European Search Report dated Sep. 20, 2004 for EP 02 73 8681.

* cited by examiner

FIG. 5
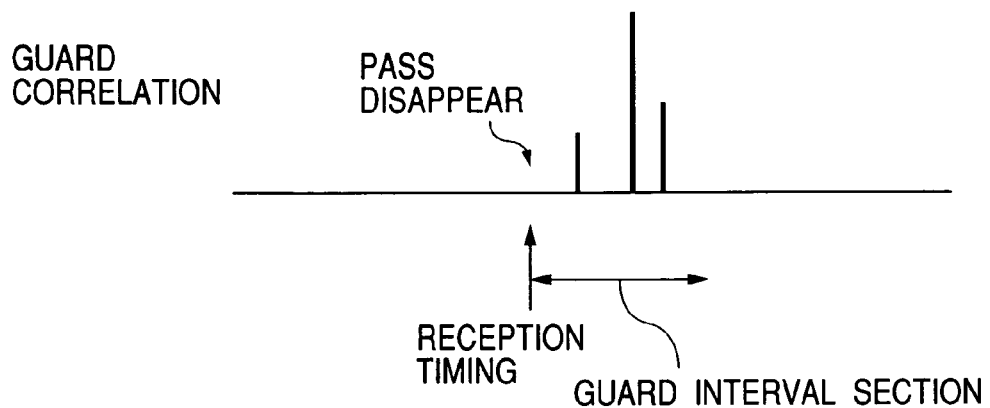
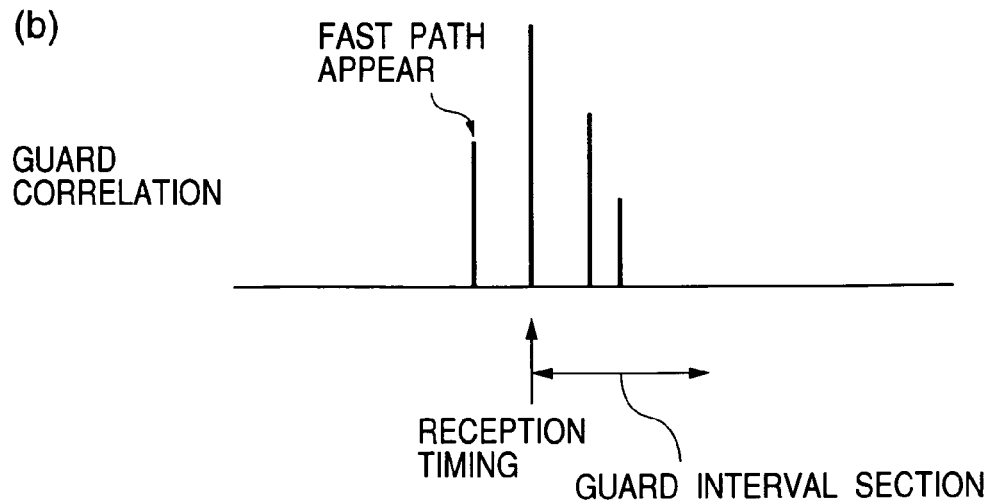

PRIOR ART

ORTHOGONAL FREQUENCY DIVISION MULTIPLE SIGNAL RECEPTION APPARATUS, RECEPTION APPARATUS, ORTHOGONAL FREQUENCY DIVISION MULTIPLE SIGNAL RECEPTION METHOD, AND RECEPTION METHOD

TECHNICAL FIELD

The present invention relates to an apparatus and method for receiving an orthogonal frequency division multiplexed signal.

BACKGROUND ART

A modulation method called an Orthogonal Frequency Division Multiplex (OFDM) method is adopted for digital terrestrial broadcasting such as Integrated Services Digital Broadcasting-Terrestrial (ISDB-T).

With this orthogonal frequency division multiplex method, as shown in FIG. 6, one OFDM symbol period is divided into an effective symbol section and a guard interval section in order to transfer a digital signal. The guard interval section is a redundant signal section copying aback portion of the effective symbol section, and is disposed in front of the effective symbol section to show the same waveform as the back portion of the effective symbol section at a symbol cycle.

FIG. 7 is a diagram showing an example of the structure of a conventional reception apparatus for receiving a broadcast signal in a system using the orthogonal frequency division multiplexed method.

With this structure, a guard correlation processor 56 performs a auto-correlation calculation of a received signal so that the position of a guard interval section can be detected. In accordance with a result of the auto-correlation calculation performed by the guard correlation processor 56, a timing adjustment unit 57 generates a control voltage for adjusting a reception timing and supplies it to a frequency variable oscillator such as a Voltage Controlled crystal Oscillator (VCXO) 59 via a loop filter 58.

During mobile reception of digital terrestrial broadcasting, the level of a reception signal of a direct wave synchronized with a reception timing may be lowered by the influence of an obstacle such as a building and there is a possibility that a path for direct wave propagation may be almost lost. If such an obstacle does not exist, there is a possibility that a direct wave propagating a faster path may arrive.

If a Single Frequency Network (SFN) is configured on the transmission side, radio waves transmitted from a plurality of transmission antennas arrive at the reception side via various paths so that the path to which the reception timing is set may disappear or a faster path may be formed abruptly.

For mobile reception of digital terrestrial broadcasting with a conventional reception apparatus, the gain of the loop filter 58 shown in FIG. 7 is set larger than that for broadcasting reception at a fixed position, in order to speed up a response speed of VCXO 59.

In this case, if a faster path than the presently set reception timing appears, the reception timing is quickly adjusted so as to receive a radio wave propagating the faster path. If a path with an adjusted reception timing disappears, the reception timing is quickly adjusted so as to receive a radio wave propagating the slower path. In this manner, a radio wave propagating a much slower path can be received.

If a path faster than the presently set reception timing appears, this path exceeds the guard interval section. In this case, the reception timing is required to be quickly adjusted.

If transmission data is demodulated in the state that adjacent OFDM symbols (effective symbols) are mixed, inter-symbol interference is generated and the demodulated waveform is not good.

PROBLEMS TO BE SOLVED BY THE INVENTION

Generally, the reception characteristics are greatly influenced by a change in the signal level of a reception wave more than a change in the delay amount to be caused by fading.

For example, there is the case that after the signal level lowers to such an extent that the path with presently set timing disappears, the path appears again in a very short time.

In such a case, if a response speed of VCXO 59 is simply set high as in the case of a conventional reception apparatus and when the signal level of a radio wave propagating the fastest path lowers, the reception timing is adjusted immediately in accordance with a radio wave having a higher signal level and propagating the slower path.

If the originally set fast path appears again in a very short time, the modulated signal is degraded more by inter-symbol interference before the timing is adjusted for the path appeared again.

The present invention has been made under such circumstances and aims to provide an apparatus and method for receiving an orthogonal frequency division multiplexed signal capable of providing a proper timing control.

DISCLOSURE OF THE INVENTION

In order to achieve the above objective, a first aspect of the invention provides an orthogonal frequency division multiplex signal reception apparatus for receiving a orthogonal frequency division multiplexed signal consisting of an effective symbol section and a guard interval section and to demodulate transmission data. This apparatus comprises demodulating means for demodulating the transmission data from a portion of the received signal corresponding to the effective symbol section, correlation calculation means for performing a auto-correlation calculation of the received signal, and timing control circuit for adjusting a reception timing of the effective symbol section, wherein the timing control means changes a speed of adjusting the reception timing of the effective symbol section in accordance with a result of the auto-correlation calculation made by the correlation calculation means.

It is preferable that the timing control means decides, from the result of the auto-correlation calculation made by the correlation calculation means, whether or not there is generated inter-symbol interference, and if it is decided that there is inter-symbol interference, adjusts the reception timing of the effective symbol section at relatively high speed, whereas if it is decided that there is generated no inter-symbol interference, adjusts the reception timing of the effective symbol section at relatively low speed.

It is preferable that the orthogonal frequency division multiplex signal reception apparatus of the invention further comprises: oscillation signal generating means for generating an oscillation signal for defining a sampling frequency for the received signal, wherein the timing control means decides, from the result of the auto-correlation calculation made by the correlation calculation means, whether or not there is generated generated inter-symbol interference, and if it is decided that there is generated generated inter-symbol interference, changes an oscillation frequency of the oscillation signal generating means at relatively high speed, whereas if it is decided that there is no inter-symbol interference, changes the oscillation frequency of the oscillation signal generating means at relatively low speed.

It is preferable that the oscillation signal generating means is a voltage controlled oscillator for generating the oscillation signal having a frequency corresponding to an amplitude of a control voltage; and the timing control means comprises: control voltage generating means for generating a control voltage signal having an amplitude corresponding to a time difference between reception timings identified by the result of the auto-correlation calculation made by the correlation calculation means; first filter means for filtering the control voltage signal generated by the control voltage generating means at a relatively large gain; second filter means for filtering the control voltage signal generated by the control voltage generating means at a relatively small gain; switch means for selecting either the control voltage signal filtered by the first filter means or the control voltage signal filtered by the second filter means and supplying the selected control voltage signal to the voltage controlled oscillator; and switching control means for switching the switch means to supply the control voltage signal filtered by the first filter means to the voltage controlled oscillator, if it is decided from the result of the auto-correlation calculation made by the correlation calculation means that there is inter-symbol interference, whereas if it is decided that there is generated no inter-symbol interference, switching the switch means to supply the control voltage signal filtered by the second filter means to the voltage controlled oscillator.

The demodulating means may include Fourier transform means for performing fast Fourier transform by using a window position as a reception period of the effective symbol section; and the timing control means decides, from the result of the auto-correlation calculation made by the correlation calculation means, whether or not there is generated inter-symbol interference, and if it is decided that there is generated inter-symbol interference, moves the window position of fast Fourier transform to be performed by the Fourier transform means at relatively high speed, whereas if it is decided that there is no generated inter-symbol interference, moves the window position of fast Fourier transform to be performed by the Fourier transform means at relatively low speed.

A second aspect of the invention provides a reception apparatus for receiving a signal consisting of an effective symbol section and a guard interval section and demodulating transmission data, wherein: it is decided whether or not there is generated inter-symbol interference, and if it is decided that there is generated inter-symbol interference, a timing of a process of receiving the effective symbol section is adjusted at relatively high speed, whereas if it is decided that there is generated no inter-symbol interference, the timing of the process of receiving the effective symbol section is adjusted at relatively low speed.

A third aspect of the invention provides a method of receiving an orthogonal frequency division multiplexed signal and demodulating transmission data, comprising steps of: demodulating the transmission data from a portion of the received signal corresponding to an effective symbol section; performing a auto-correlation calculation of the received signal; and adjusting a reception timing of the effective symbol section by changing a speed of adjusting a reception timing of the effective symbol section in accordance with a result of the auto-correlation calculation.

A fourth aspect of the invention provides a reception method comprising steps of: receiving a signal consisting of an effective symbol section and a guard interval section; judging whether or not there is generated inter-symbol interference; and adjusting a timing of a process of receiving the effective symbol section at relatively high speed if it is decided that there is generated inter-symbol interference, whereas if it is decided that there is generated no inter-symbol interference, adjusting the timing of the process of receiving the effective symbol section at relatively low speed.

BRIEF DESCRIPTION OF THE DRAWINGS

FIG. 5 shows diagrams illustrating an operation of a switch control to be executed by an inter-symbol judgment unit.

EMBODIMENTS OF THE INVENTION

With reference to the accompanying drawings, an orthogonal frequency division multiplex signal reception apparatus according to an embodiment of the invention will be described in detail.

Figure 1:
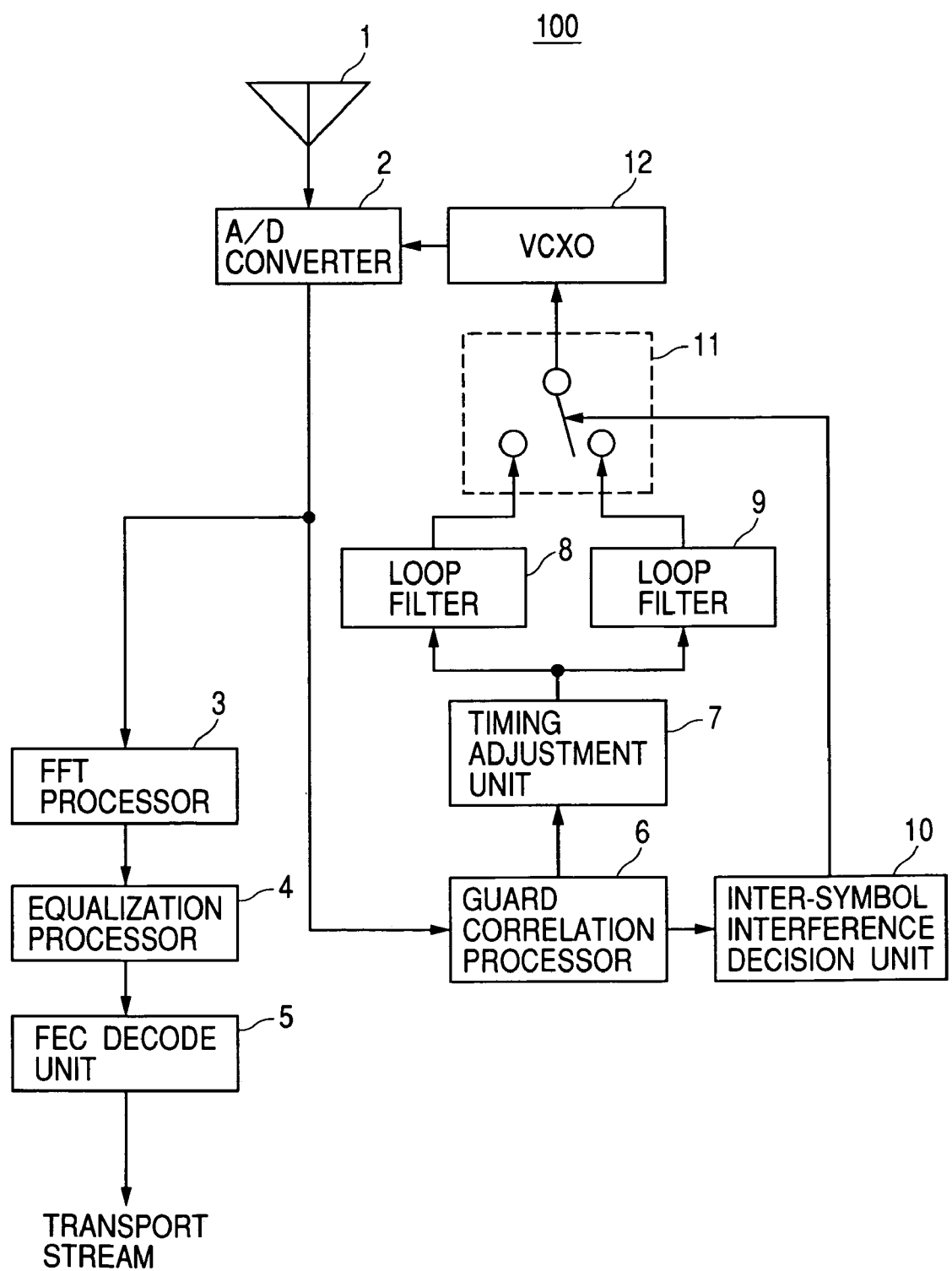
FIG. 1 is a diagram showing the structure of an orthogonal frequency division multiplex signal reception apparatus according to an embodiment of the invention.

FIG. 1 is a diagram showing the structure of an orthogonal frequency division multiplex signal reception apparatus 100 according to an embodiment of the invention.

As shown in FIG. 1, the orthogonal frequency division multiplex signal reception apparatus 100 is constituted of an antenna 1, an Analog/Digital (A/D) converter 2, a Fast Fourier Transform (FFT) processor 3, an equalization processor 4, a Forward Error Correction (FEC) decoder 5, a guard correlation processor 6, a timing adjustment unit 7, first and second loop filters 8 and 9, an inter-symbol interference judgement unit 10, a switch 11 and a VCXO 12.

The A/D convertor 2 samples a signal received with the antenna 1 and converts it into a digital signal.

The FFT processor 3 performs fast Fourier transform or the like of a reception signal digitalized by the A/D converter 2 to convert time series data into frequency series data.

With the orthogonal frequency division multiplex method, a number of sub-carriers whose carrier frequencies are in an orthogonal relation are used for digital signal transmission. Therefore, a reception signal is converted into frequency series data by fast Fourier transform or the like to identify the phase and amplitude of each carrier to demodulate the transmitted data.

The equalization processor 4 performs an equalization process or the like by using Scattered Pilot (SP) signals scattered at predetermined sub-carriers in the reception signal, to thereby correct the transmission data demodulated from a sub-carrier.

The FEC decode unit 5 corrects any error contained in the demodulated transmission data to recover an information signal such as a transport stream.

The guard correlation processor 6 performs a auto-correlation calculation of a reception signal digitalized by the A/D converter 2 to detect the position of a guard interval section of the reception signal.

In accordance with a result of the auto-correlation calculation executed by the guard correlation processor 6, the timing adjustment unit 7 adjusts the reception timing of the effective symbol section.

For example, the timing adjustment unit 7 identifies the position of the guard interval section from the result of the auto-correlation calculation made by the guard correlation processor 6, to thereby identify a difference (time difference) between the timing when a sampling process for receiving the effective symbol section starts and the timing when the effective symbol section is actually received. The timing adjustment unit 7 generates a control voltage having an amplitude corresponding to the identified time difference, and supplies it to VCXO 12.

The first and second loop filters 8 and 9 filter the control voltage signal output from the timing adjustment unit 7.

The first loop filter 8 has a comparatively large gain set so as to quickly adjust the reception timing, whereas the second loop filter 9 has a comparatively small gain so as to slowly adjust the reception timing.

The control voltage passed through the first and second loop filters 8 and 9 is sent to the switch 11.

In accordance with the result of the auto-correlation calculation made by the guard correlation processor 6, the inter-symbol interference judgment unit 10 decides whether there is inter-symbol interference. Namely, the inter-symbol interference judgement unit 10 decides that there is inter-symbol interference if the result of the auto-correlation calculation made by the guard correlation processor 6 shows that a correlation value representative of the presence of another path exists in a predetermined range before the reception timing presently set for the path.

For example, the inter-symbol interference judgement unit 10 decides that there is inter-symbol interference if a correlation value representative of the presence of another path exists in a predetermined time range corresponding to the effective symbol section before the reception timing presently set for the path.

In accordance with the judgement result whether there is inter-symbol interference, the inter-symbol interference judgement unit 10 controls the switching of the switch 11 to select one of the control voltage signals output from the first and second loop filters 8 and 9 and supply the selected control voltage signal to VCXO 12.

Specifically, if the inter-symbol interference judgement unit 10 decides that there is inter-symbol interference, the inter-symbol interference judgment unit 10 controls the switch 11 to supply the control voltage output from the first loop filter 8 to VCXO 12. On the other hand, if the inter-symbol interference judgement unit 10 decides that there is no inter-symbol interference, the inter-symbol interference judgment unit 10 controls the switch 11 to supply the control voltage output from the second loop filter 9 to VCXO 12.

For example, the switch 11 is made of a semiconductor switch or the like. In accordance with the control by the inter-symbol interference judgement unit 10, the switch 11 selects the control voltage to be supplied to VCXO 12 from the control voltages filtered by the first and second loop filters 8 and 9.

VCXO 12 supplies an oscillation signal to the A/D converter 2 to define a sampling frequency for a reception signal. In accordance with the amplitude of a control voltage supplied from the switch 11, VCXO 12 changes the frequency of the oscillation signal to change the reception timing of the effective symbol section.

If the sampling period of time series data varies when the FFT processor 3 performs fast Fourier transform, correct frequency component data cannot be obtained. In order to avoid this, it is desired that VCXO 12 changes the frequency of an oscillation signal during the period while a signal corresponding to the guard interval section is received, and that VCXO 12 does not change the frequency of an oscillation signal during the period while a signal corresponding to the effective symbol section is received.

The operation of the orthogonal frequency division multiplex signal reception apparatus 100 according to the embodiment of the invention will be described in the following.

The orthogonal frequency division multiplex signal reception apparatus 100 receives at the antenna 1 an orthogonal frequency division multiplex signal transmitted from the transmission side in the form of radio waves, and inputs it to the A/D convertor 2.

The A/D converter 2 samples the received signal and converts it into a digital signal which is sent to the FFT processor 3 and guard correlation processor 6.

The FFT processor 3 parallelizes the received signal digitalized by the A/D converter 2 and performs fast Fourier transform of the received signal to convert time domain data into frequency component data.

With the orthogonal frequency division multiplex method, one OFDM symbol period is divided into an effective symbol section and a guard interval section.

The FFT processor 3 performs fast Fourier transform of the received signal corresponding to the effective symbol section of a received signal propagated via the fastest path, so that the transmitted data can be demodulated without an obstruction of the slow path (multi path) having a delay amount not in excess of the guard interval section.

Figure 2:
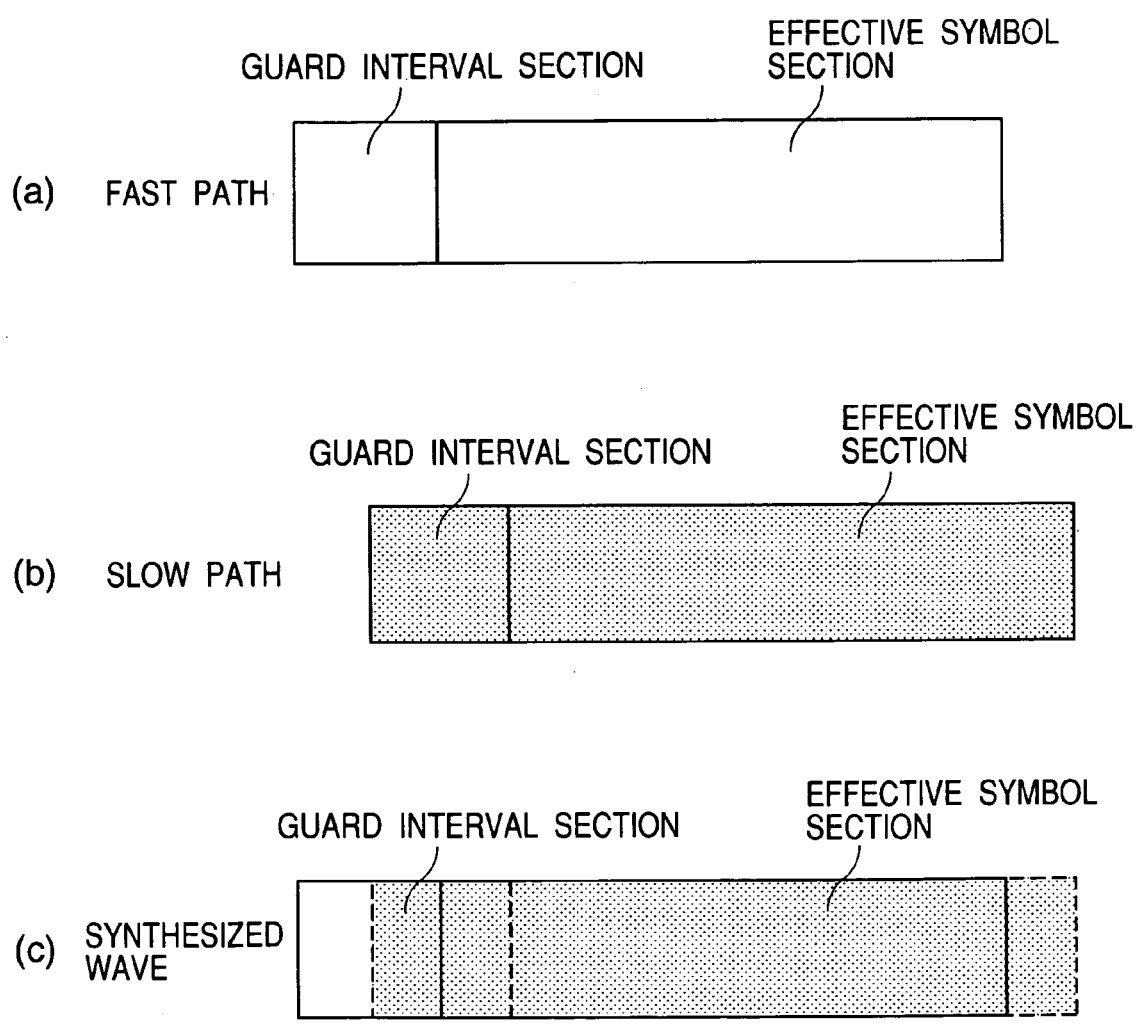
FIG. 2 shows diagrams illustrating radio waves arriving at the orthogonal frequency division multiplex signal reception apparatus.

It is assumed, for example, that a radio wave propagating the fast path such as shown in FIG. 2(*a*) and a radio wave (delayed wave) propagating the slow path such as shown in FIG. 2(*b*) are synthesized so that a radio wave such as shown in FIG. 2(*c*) arrives at the orthogonal frequency division multiplex signal reception apparatus 100.

In this case, the FFT processor 3 performs fast Fourier transform of a received signal in the effective symbol section propagating the fast path such as shown in FIG. 2(*a*). It is therefore possible to demodulate the transmitted data without influence of the delayed radio wave.

The FFT processor 3 sends the demodulated data to the equalization processor 4.

The equalization processor 4 derives an SP signal in a predetermined sub-carrier from the transmitted data received from the FFT processor 3 to correct the received signal through equalization or the like.

The equalization processor 4 sends the corrected transmitted data to the FEC decode unit 5.

The FEC decode unit 5 corrects any error in the transmitted data supplied from the equalization unit 4 to recover and output information signals such as a transport stream.

The guard correlation processor 6 performs a auto-correlation calculation of the received signal digitalized by the A/D converter 2 to detect the position of the guard interval section and the reception timing of the effective symbol section.

In this case, the guard correlation processor 6 performs the auto-correlation calculation of the received signal by using the delay amount and an effective symbol length.

For example, when the auto-correlation calculation of a received signal is performed under the state that a multi path is not formed, one sharp peak correlation value is obtained in the OFDM symbol period because the signal in the guard interval section is copied from the back portion of the effective symbol section.

Figure 3:
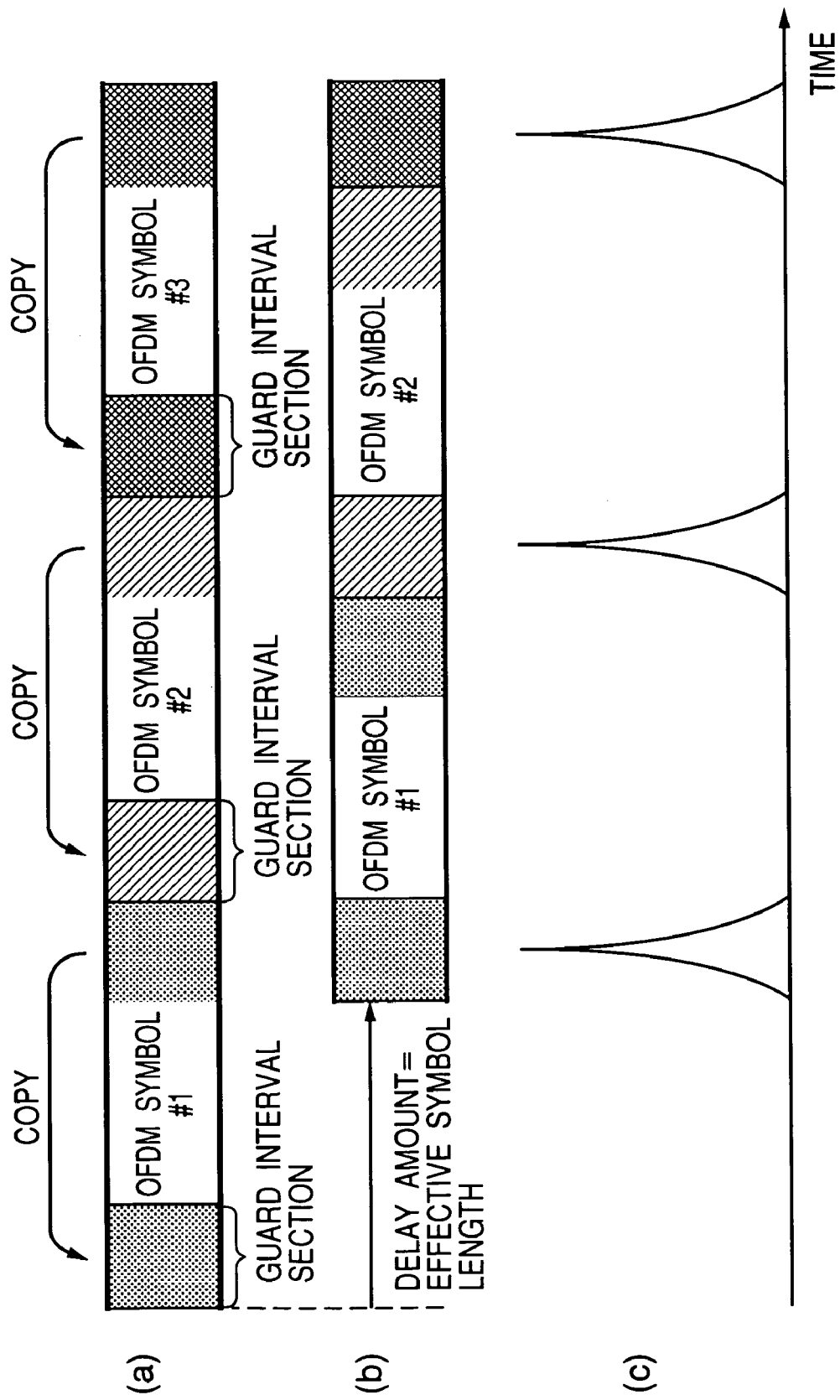
FIG. 3 shows diagrams illustrating a auto-correlation calculation to be executed by a guard correlation processor.

Namely, assuming that an OFDM symbol such as shown in FIG. 3(a) is received, the guard correlation processor 6 performs a auto-correlation calculation by using a symbol added with the delay amount corresponding to the effective symbol length as shown in FIG. 3(b). In FIGS. 3(a) and 3(b), signals indicated by the same pattern have the same waveform.

With this auto-correlation calculation, correlation values changing with time such as shown in FIG. 3(c) can be obtained. In accordance with the timing when the correlation value takes a peak value, the position of the guard interval section and the reception timing of the effective symbol section can be identified.

Figure 4:
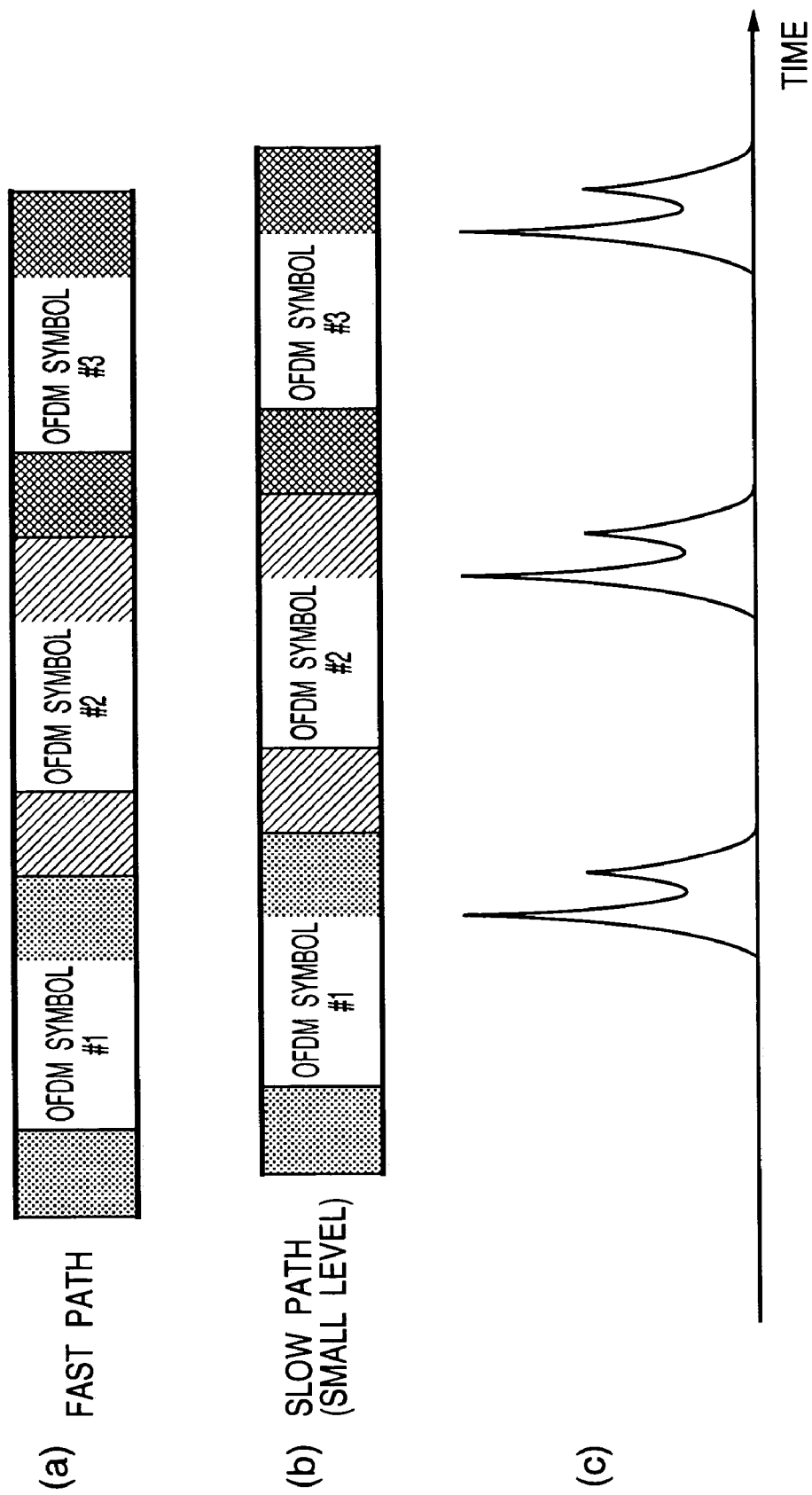
FIG. 4 shows diagrams illustrating a auto-correlation calculation to be executed by the guard correlation processor.
Figure 6:
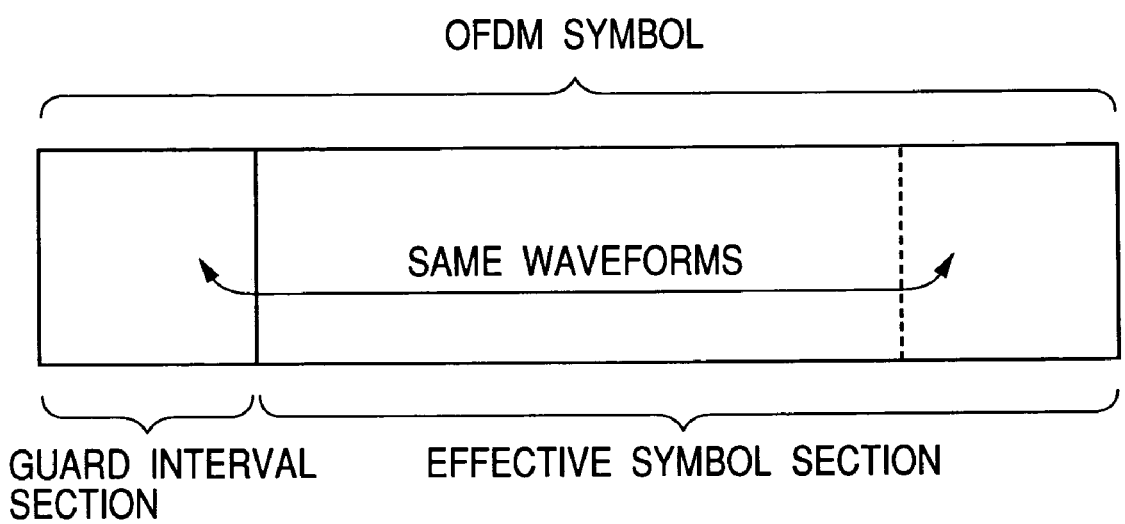
FIG. 6 is a diagram showing a signal to be transferred by an orthogonal frequency division multiplex method.

It is also assumed that a radio wave propagating the fast path such as shown in FIG. 4(a) and a radio wave propagating the slow path such as shown in FIG. 4(b) synthesized together arrive at the orthogonal frequency division multiplex reception apparatus 100. It is also assumed that the reception level of the radio wave propagating the slow path is smaller than that of the radio wave propagating the fast path.

In this case, the correlation values obtained by the auto-correlation calculation of the received signal performed by the guard correlation processor 6 change with time such as shown in FIG. 4(c).

Namely, a peak of the correlation value including a large peak corresponding to the fast path and a small peak corresponding to the slow path appears during the OFDM symbol period.

In accordance with the result of the auto-correlation calculation of the received signal performed by the guard correlation processor 6, the timing adjustment unit 7 identifies a time difference between the timing when the sampling process of the A/D converter 2 starts for receiving the effective symbol section at the A/D converter 2 and the reception timing of an actual effective symbol section (effective symbol section of the received signal propagating the fastest path).

The timing adjustment unit 7 generates a control voltage signal having an amplitude corresponding to the identified time difference, and supplies it to VCXO 12.

The control voltage signal output from the timing adjustment unit 7 is input to the first and second loop filters 8 and 9.

The first and second loop filters 8 and 9 filter the control voltage signal supplied from the timing adjustment unit 7 and output the filtered signals to the switch 11.

Under the control of the inter-symbol interference judgement unit 10, the switch 11 selects one of the signals filtered by the first and second loop filters 8 and 9 and outputs it as a control voltage signal to be supplied to VCXO 12.

The inter-symbol interference judgement unit 10 controls the switch 11 in accordance with the result of the auto-correlation calculation of the guard correlation processor 6.

Namely, the inter-symbol interference judgement unit 10 decides from the result of the auto-correlation calculation whether there is inter-symbol interference. If it is decided that there is inter-symbol interference, the control voltage signal output from the first loop filter 8 is selected by the switch 11.

If the inter-symbol interference judgement unit 10 decides that there is no inter-symbol interference, the control voltage signal output from the second loop filter 9 is selected by the switch 11.

Figure 7:
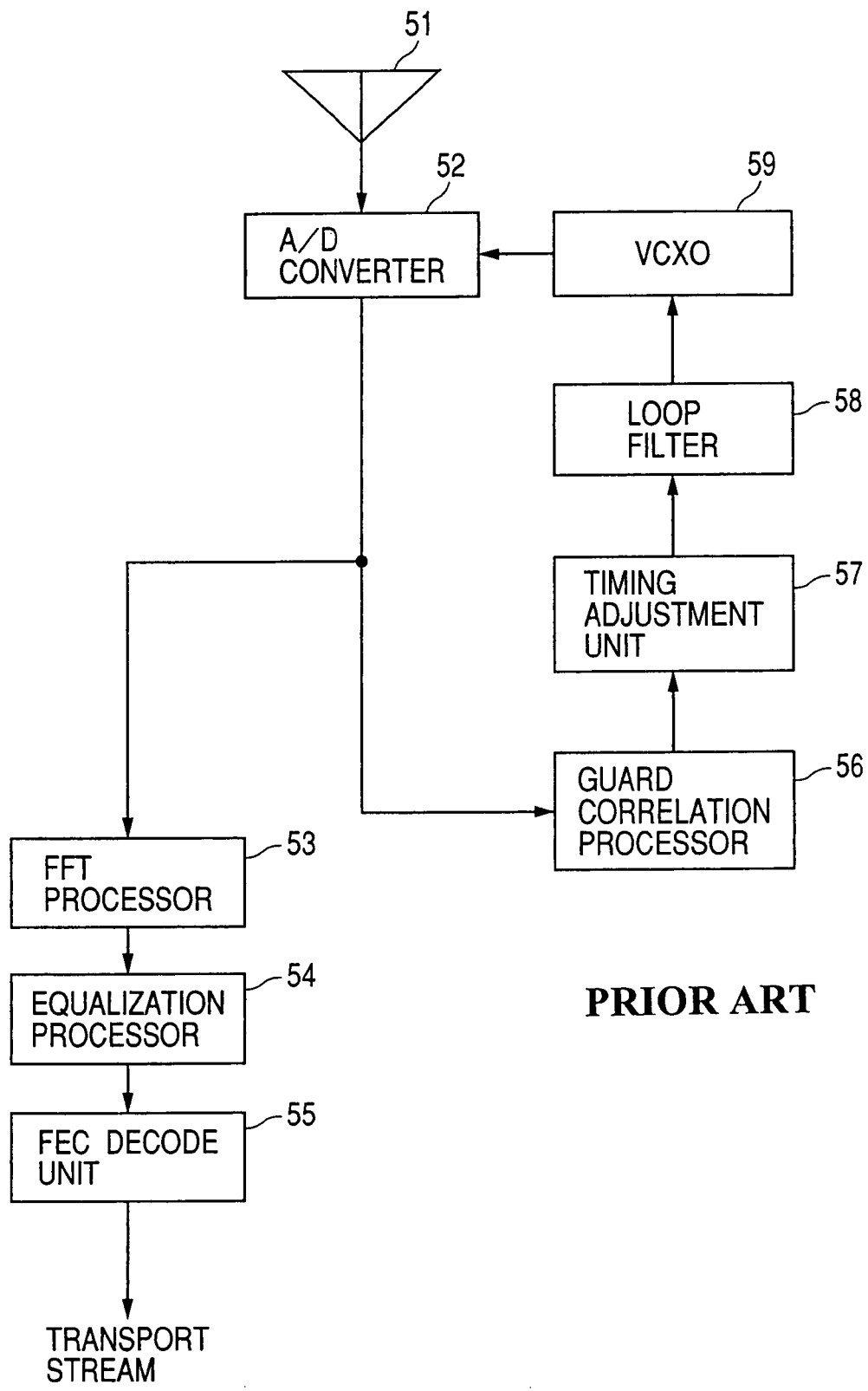
FIG. 7 is a diagram showing an example of the structure of a conventional reception apparatus.

The first loop filter 8 has a comparatively large gain of the same degree of a loop filter (e.g., loop filter 58 shown in FIG. 7) of the conventional reception apparatus for mobil reception of digital terrestrial broadcasting.

Therefore, as the control voltage signal output from the first loop filter 8 is supplied to VCXO 12, the frequency of an oscillation signal can be altered at relatively high speed. Namely, as the control voltage signal output from the first loop filter 8 is supplied to VCXO 12, the timing when the sampling process starts for receiving the effective symbol section can be adjusted at relatively high speed.

The second loop filter 9 has a small gain as compared to the first loop filter 8.

Therefore, as the control voltage signal output from the second loop filter 9 is supplied to VCXO 12, the frequency of an oscillation signal can be altered at relatively low speed. Namely, as the control voltage signal output from the second loop filter 9 is supplied to VCXO 12, the timing when the sampling process starts for receiving the effective symbol section can be adjusted at relatively low speed.

In the above manner, the inter-symbol interference judgement unit 10 can change the adjustment speed of the timing when the sampling process starts for receiving the effective symbol section, in accordance with whether there is inter-symbol interference, by controlling the switch 11 in accordance with the result of the auto-correlation calculation of the received signal performed by the guard correlation processor 6.

For example, as shown in FIG. 5(a), it is assumed that the reception level of a radio wave propagating the fastest path lowers and the path disappears.

In this case, the inter-symbol interference judgement unit 10 decides that there is no inter-symbol interference because the remaining slow paths exist in the time range (guide interval time) corresponding to the guide interval section after the reception timing presently set.

The inter-symbol interference judgement unit 10 controls the switch 11 to supply VCXO 12 with the control voltage signal output from the second loop filter 9.

In this manner, the reception timing can be adjusted at relatively low speed when the reception timing is controlled so as to match the fastest path among the remaining paths.

Also, for example, as shown in FIG. 5(b) it is assumed that a path appears which is faster than the path to which the reception timing is set presently.

In this case, the inter-symbol interference judgement unit 10 decides that there is inter-symbol interference because the newly appearing path exists in the time range corresponding to the effective symbol section before the reception timing presently set.

The inter-symbol interference judgement unit 10 controls the switch 11 to supply VCXO 12 with the control voltage signal output from the first loop filter 8.

In this manner, the reception timing can be adjusted at relatively high speed when the reception timing is controlled so as to match the newly appearing fast path.

As described above, the reception timing is adjusted at low speed when the fastest path disappears. Therefore, even if the path to which the reception timing is presently set disappears during a very short time due to fading or the like, the reception timing can be adjusted quickly so as to match the reappearing original path.

Namely, even if the path to which the reception timing is presently set disappears during a very short time and reappears, the reception timing can be adjusted quickly by narrowing a return width for adjusting the reception timing.

It is therefore possible to prevent the transmission waveform from being degraded by suppressing generation of inter-symbol interference, and to demodulate the transmission data properly.

By applying the invention to a reception apparatus for receiving broadcasting radio waves in a system adopting the orthogonal frequency division multiplex method such as ISDB-T, it becomes possible to properly control a mobile reception timing and prevent the transmission waveform from being degraded by suppressing generation of inter-symbol interference.

In the above-described embodiment, the reception timing is adjusted by controlling the timing when the sampling process of the A/D converter 2 for receiving the effective symbol section starts.

The invention is not limited only thereto, but it is applicable to arbitrary techniques which adjust the reception timing.

For example, the reception timing of an effective symbol section may be adjusted by controlling the position of a window of fast Fourier transform to be executed by the FFT processor 3.

In this case, the inter-symbol interference judgment unit 10 sends a control signal to the FFT processor 3 to thereby instruct to change the position of the window for fast Fourier transform.

If the inter-symbol judgement unit 10 decides, from the result of the auto-correlation calculation of a received signal performed by the guard correlation processor 6, that there is inter-symbol interference, the position of the window for fast Fourier transform is moved at relatively high speed. If the inter-symbol interference judgment unit 10 decides that there is no inter-symbol interference, the position of the window for fast Fourier transform is moved at relatively low speed.

Similar to controlling the sampling timing of the A/D converter 2, the reception timing of the effective symbol section can be controlled.

Also in this case, when the inter-symbol interference judgement unit 10 decides that there is no inter-symbol interference, the inter-symbol interference judgement unit 10 may control the operation of the FFT processor 3 so as not to change the position of the window for fast Fourier transform during a predetermined time period.

Even if a path disappears in a very short time due to fading or the like, the reception timing can be set to the original path without generation of inter-symbol interference.

EFFECTS OF THE INVENTION

According to the invention, the timing control of receiving a signal consisting of an effective symbol section and a guard interval section can be performed properly.

What is claimed is:

1. An orthogonal frequency division multiplex signal reception apparatus for receiving an orthogonal frequency division multiplexed signal consisting of an effective symbol section data and a guard interval section, and to demodulate transmission data, said apparatus comprising:

demodulation means for demodulating the transmission data from a portion of the received signal corresponding to the effective symbol section;

correlation calculation means for performing an auto-correlation calculation on the received signal to create an auto-correlation signal; and timing control means for generating a control signal to be used to adjust a reception timing of the effective symbol section on the basis of first information extracted from the auto-correlation signal, wherein said timing control means operates to change a speed of adjusting the reception timing of the effective symbol section by changing a response speed of said timing control means itself on the basis of second information extracted from the auto-correlation signal created by said correlation calculation means, the second information being indicative of whether or not inter-symbol interference is generated, and wherein the speed of adjusting the reception timing is controlled so that when the inter-symbol interference is being generated the speed is set at relatively high speed and when the inter-symbol interference is not being generated the speed is set at relatively low speed.

2. The orthogonal frequency division multiplex signal reception apparatus according to claim 1, further comprising:

oscillation signal generating means for generating an oscillation signal for defining a sampling frequency for the received signal, wherein said timing control means decides, based on the result of the auto-correlation calculation made by said correlation calculation means, whether or not there is generated inter-symbol interference, and if it is decided that there is generated inter-symbol interference, changes an oscillation frequency of said oscillation signal generating means at relatively high speed, whereas if it is decided that there is generated no inter-symbol interference, changes the oscillation frequency of said oscillation signal generating means at relatively low speed.

3. The orthogonal frequency division multiplex signal reception apparatus according to claim 2, wherein:

said oscillation signal generating means is a voltage controlled oscillator for generating the oscillation signal having a frequency corresponding to an amplitude of a control voltage; and said timing control means comprises:

control voltage generating means for generating a control voltage signal having an amplitude corresponding to a time difference between reception timings identified by the result of the auto-correlation calculation made by said correlation calculation means;

first filter means for filtering the control voltage signal generated by said control voltage generating means at a relatively large gain;

second filter means for filtering the control voltage signal generated by said control voltage generating means at a relatively small gain;

switch means for selecting either the control voltage signal filtered by said first filter means or the control voltage signal filtered by said second filter means and supplying the selected control voltage signal to said voltage controlled oscillator; and switching control means for switching said switch means to supply the control voltage signal filtered by said first filter means to said voltage controlled oscillator, if it is decided based on the result of the auto-correlation calculation made by said correlation calculation means that there is generated inter-symbol interference, whereas if it is decided that there is no generated inter-symbol interference, switching said switch means to supply the control voltage signal filtered by said second filter means to said voltage controlled oscillator.

4. The orthogonal frequency division multiplex signal reception apparatus according to claim 3, wherein:

said demodulating means includes Fourier transform means for performing fast Fourier transform by using a reception period of the effective symbol section as a window position; and said timing control means decides, based on the result of the auto-correlation calculation made by said correlation calculation means, whether or not there is generated inter-symbol interference, and if it is decided that there is inter-symbol interference, moves the window position of fast Fourier transform to be performed by said Fourier transform means at relatively high speed, whereas if it is decided that there is no generated inter-symbol interference, moves the window position of fast Fourier transform to be performed by said Fourier transform means at relatively low speed.

5. The orthogonal frequency division multiplex signal reception apparatus according to claim 2, wherein:

said demodulating means includes Fourier transform means for performing fast Fourier transform by using a reception period of the effective, symbol section as a window position; and said timing control means decides, based on the result of the auto-correlation calculation made by said correlation calculation means, whether or not there is generated inter-symbol interference, and if it is decided that there is inter-symbol interference, moves the window position of fast Fourier transform to be performed by said Fourier transform means at relatively high speed, whereas if it is decided that there is no generated inter-symbol interference, moves the window position of fast Fourier transform to be performed by said Fourier transform means at relatively low speed.

6. The orthogonal frequency division multiplex signal reception apparatus according to claim 1, wherein:

said demodulating means includes Fourier transform means for performing fast Fourier transform by using a reception period of the effective symbol section as a window position; and said timing control means decides, based on the result of the auto-correlation calculation made by said correlation calculation means, whether or not there is generated inter-symbol interference, and if it is decided that there is inter-symbol interference, moves the window position of fast Fourier transform to be performed by said Fourier transform means at relatively high speed, whereas if it is decided that there is no generated inter-symbol interference, moves the window position of fast Fourier transform to be performed by said Fourier transform means at relatively low speed.

7. A method of receiving an orthogonal frequency division multiplexed signal to demodulate transmission data, said method comprising the steps of:

demodulating the transmission data from a portion of the received signal corresponding to an effective symbol section;

performing an auto-correlation calculation on the received signal to create an auto-correlation signal; and adjusting a reception timing of the effective symbol section on the basis of first information extracted from the auto-correlation signal while changing a speed of the adjustment of the reception timing on the basis of second information extracted from the auto-correlation signal, the second information being indicative of whether or not inter-symbol interference is generated, wherein the speed of the adjustment of the reception timing is controlled so that when the inter-symbol interference is being generated the speed is set at relatively high speed and when the inter-symbol interference is not being generated the speed is set at relatively low speed.

* * * * *